(12) United States Patent
Steiner et al.

(10) Patent No.: US 11,668,033 B2
(45) Date of Patent: Jun. 6, 2023

(54) HIGH QUALITY MELT-BLOWN WEBS WITH IMPROVED BARRIER PROPERTIES

(71) Applicant: BOREALIS AG, Vienna (AT)

(72) Inventors: Lisa Maria Steiner, Königswiesen (AT); Gerhard Hubner, Breitenaich (AT); Jingbo Wang, Engerwitzdorf (AT); Markus Gahleitner, Neuhofen/Krems (AT); Georg Grestenberger, St. Peter in der AU (AT); Joachim Fiebig, Engerwitzdorf (AT)

(73) Assignee: BOREALIS AG, Vienna (AT)

( * ) Notice: Subject to any disclaimer, the term of this patent is extended or adjusted under 35 U.S.C. 154(b) by 612 days.

(21) Appl. No.: 16/304,779

(22) PCT Filed: Jun. 8, 2017

(86) PCT No.: PCT/EP2017/063902
§ 371 (c)(1),
(2) Date: Nov. 27, 2018

(87) PCT Pub. No.: WO2017/216017
PCT Pub. Date: Dec. 21, 2017

(65) Prior Publication Data
US 2020/0325607 A1    Oct. 15, 2020

(30) Foreign Application Priority Data

Jun. 13, 2016 (EP) .................... 16174131

(51) Int. Cl.
*C08F 8/50* (2006.01)
*D04H 3/007* (2012.01)
(Continued)

(52) U.S. Cl.
CPC ............... *D04H 1/56* (2013.01); *C08F 8/50* (2013.01); *D04H 1/4291* (2013.01);
(Continued)

(58) Field of Classification Search
None
See application file for complete search history.

(56) References Cited

U.S. PATENT DOCUMENTS 3,841,953 A  10/1974  Lohkamp et al.
3,849,241 A  11/1974  Butin et al.
(Continued)

FOREIGN PATENT DOCUMENTS

CN    1820034 A    8/2006
CN    101432319    5/2009
(Continued)

OTHER PUBLICATIONS

Resconi, et al. "Highly Regiospecific Zirconocene Catalysts for the Isospecific Polymerization of Propene", J. Am. Chem. Soc. 1998, 120, 2308-2321.
(Continued)

*Primary Examiner* — Jennifer A Gillett
(74) *Attorney, Agent, or Firm* — Tarolli, Sundheim, Covell & Tummino LLP (57) ABSTRACT

High quality melt-blown webs having improved barrier properties (3rd drop, cm H2O resp. mbar) and a widened process window. The melt-blown webs show a specific chain structure.

5 Claims, 3 Drawing Sheets

(51) Int. Cl.
*D04H 3/16* (2006.01)
*D04H 1/56* (2006.01)
*D04H 1/4291* (2012.01)
*D04H 1/544* (2012.01)

(52) U.S. Cl.
CPC ............ *D04H 1/544* (2013.01); *D04H 3/007* (2013.01); *D04H 3/16* (2013.01); *C08F 2810/10* (2013.01)

(56) References Cited

U.S. PATENT DOCUMENTS

| | | | |
|---|---|---|---|
| 4,668,566 A * | 5/1987 | Braun | A61F 13/15658 156/220 |
| 5,443,898 A | 8/1995 | Gessner et al. | |
| 6,454,980 B1 | 9/2002 | Siano et al. | |
| 2003/0050411 A1* | 3/2003 | Gaynor | C08F 257/02 526/90 |
| 2004/0245171 A1 | 12/2004 | Schimmel | |
| 2011/0245425 A1* | 10/2011 | Han | C08F 8/00 525/194 |
| 2012/0108714 A1* | 5/2012 | Wittner | D01D 5/098 524/108 |
| 2012/0123374 A1* | 5/2012 | Richeson | D01F 6/30 604/372 |
| 2013/0137329 A1 | 5/2013 | Van Paridon et al. | |
| 2014/0155854 A1 | 6/2014 | Macdonald et al. | |

FOREIGN PATENT DOCUMENTS

| | | |
|---|---|---|
| CN | 101906227 A | 12/2010 |
| CN | 102639769 A | 8/2012 |
| CN | 103237932 A | 8/2013 |
| CN | 104968848 A | 10/2015 |
| CN | 105524351 A | 4/2016 |
| CN | 105623074 A | 6/2016 |
| EP | 0287239 A1 | 10/1988 |
| EP | 0569860 A1 | 11/1993 |
| EP | 0887379 B1 | 12/1998 |
| EP | 1028984 B1 | 7/2001 |
| EP | 2610271 A1 | 7/2013 |
| EP | 2610272 A1 | 7/2013 |
| EP | 2610273 A1 | 7/2013 |
| EP | 3034522 A1 | 6/2016 |
| WO | 92/12182 A1 | 7/1992 |
| WO | 99/24478 A1 | 5/1999 |
| WO | 99/24479 A1 | 5/1999 |
| WO | 00/68315 A1 | 11/2000 |
| WO | 2004/000899 A1 | 12/2003 |
| WO | 2004/111095 A1 | 12/2004 |
| WO | 2007/12661 A1 | 2/2007 |
| WO | 2007126961 A1 | 11/2007 |
| WO | 2012/007430 A1 | 1/2012 |
| WO | 2012055797 A1 | 5/2012 |
| WO | 2012064468 A2 | 5/2012 |
| WO | 2015/095320 A1 | 6/2015 |

OTHER PUBLICATIONS

Jakubowski et al., "ATRP for Everyone: Ligands and Initiators for the Clean Synthesis of Functional Polymers", Aldrich Materials Science, 2012.
Braunecker, et al., "Controlled/living radical polymerization: Features, developments, and perspectives", Prog. Polym. Sci. 32 (2007) 93-146.
Tasdelen et al., "Telechelic polymers by living and controlled/living polymerization methods", Progress in Polymer Science 36 (2011) 455-567.
Bagryanskaya, et al., "Scavenging of Organic C-Centered Radicals by Nitroxides", Chem. Rev. 2014, 114, 5011-5056.
Kawahara, et al., "Study on chain end structures of polypropylenes prepared with different symmetrical metallocene catalysts". Polymer 45 (2004) 2883-2888.
Resconi, et al., "Selectivity in Propene Polymerization with Metallocene Catalysts", Chem. Rev. 2000, 100, 1253-1345.
Zweifel, "Coloration of Styrenic and Acrylic Polymers", 2001.
Office action for Korean Patent Application No. 10-2018-7035165, dated Nov. 20, 2019.
Chinese Office Action for Application No. 201780032907.8 dated Aug. 17, 2020.
Brazilian Office Action; Brazilian Application No. BR112018072806; Filed: Jun. 8, 2017; 6 pgs.
European Application Search Report dated Jan. 3, 2017.

* cited by examiner

HIGH QUALITY MELT-BLOWN WEBS WITH IMPROVED BARRIER PROPERTIES

The present invention is related to high quality melt-blown webs having improved barrier properties (3rd drop, cm H2O resp. mbar) and a widened process window. The melt-blown webs of the invention show specific chain structure.

BACKGROUND

A melt-blown web, being a non-woven structure consisting of melt-blown fibers, is typically made in a one-step process in which high-velocity air blows a molten thermoplastic resin from an extruder die tip onto a conveyor or take-up screen to form fine fibered self-bonding web.

The processing temperature is one factor in the final fabric properties. The "optimum" processing temperature is one at which ideal properties of the fabric are achieved, such as low amount of shots with good hand and high barrier properties, or good filtration properties. Web quality is controlled by many factors such as the uniformity of the fiber distribution in the air stream and adjustment of other manufacturing variables such as processing temperature. Another factor controlling fabric quality is the property combination of the polypropylene. Several defects can result from a poor selection of polymer physical properties such as roping, fly, and shot. Shots are pinpoint-sized polypropylene beads in the fabric that affect porosity, uniformity, and hand (texture) of the fabric, and are a principle cause of off-quality fabric.

The presence of shots decreases the hydrohead of the web, which is an indirect measure of the porosity and proportional to the liquid barrier of the fabric.

Melt-blown webs are widely used in the hygiene and filtration industry, for which the key properties are the barrier properties, meaning hydrohead (water/liquid barrier) and filtration efficiency (with particles).

Although many types of polymers can be employed for melt-blown fibers and fabrics, polypropylene is one of the most commonly used polymers.

Polypropylenes are produced using heterogeneous Ziegler-Natta catalysts or metallocene catalysts. Generally, commercial PP resins made from Ziegler-Natta catalyst have a broad Molecular Weight Distribution (MWD) as a result of the broad distribution of active sites on the catalyst. MWD is a difficult characteristic to control, especially when Ziegler-Natta catalysts are being used.

Because the MWD significantly determines the properties and the performance in processing, this characteristic must be controlled. Control of MWD of the PP in conventional reactors is difficult because it requires the addition of chain terminators and chain transfer agents. These operations decrease output of the reactor and are often uneconomical.

Therefore, as an alternative, this control is accomplished via a post-reactor operation that is commonly known as controlled degradation of polypropylene (PP).

The controlled degradation of PP is a well-known procedure in polymer processing engineering and the plastics industry. Its importance is based on the fact that by thermally decomposing and, as a result, reducing the length of the carbon chain of the PP, one can obtain different products with controlled rheological properties. Because of that, these products are referred to as Controlled-Rheology Polypropylenes (CR-PP).

In general, it has been concluded that CR-PP resins have lower molecular weight, narrower MWD and reduced viscosity compared to the base resin before degradation.

The process of degradation needs what is called a "radical initiator".

This is a chemical substance which—under particular circumstances—will promote the formation of free radicals inducing chain degradation. Especially for the PP resins, peroxides have dominated the field as free radical initiators; CR-PP resins have been produced industrially for years using reactive extrusion processes which employ peroxides as free radical initiators.

The use of peroxides has a drawback, since only a restricted "processing temperature window" is available because of their decomposition temperatures, which are generally below the customary temperatures of polymer processing. Furthermore by using peroxides unfavourable odour is introduced into the final product, which limits the usage possibilities of such CR-PP resins.

In addition, strict safety regulations have to be adhered to during storage, handling and processing of peroxides. A further disadvantage of peroxides is the impossibility of decomposition-free melt compounding with polymers.

From the literature controlled radical polymerization processes (CRP), like Atom Transfer Radical Polymerization (ATRP) or Nitroxide-mediated Polymerization (NMP), are known, which were developed to make polymers with precised chain structure. These are described for Example in many publications, like in the Controlled Radical Polymerization Guide of the Company SigmaAldrich for 2012, in Prog. Polym. Sci. 32 (2007) 93-146 or Progress in Polymer Science 36 (2011) 455-567 etc.

Compared to the conventional radical polymerization process, the polymers made from such processes have narrower molecular weight distribution and better chain end group control. These publications do not mention the use of so produced polymers for melt-blown webs.

In addition, so far there are limited examples of applying this technique in industrial scale, for examples, there are limited examples about using these types of radicals to initiate the visbreaking process of polypropylene, creating unique chain structure and use such kind of materials in production of products with improved properties.

Thus, although melt-blown webs made out of called "controlled rheology" propylene (CR-PP), are known quite some years in the art, there is still a need for improvement of the web quality, by broadening the process window and improving the barrier properties.

SUMMARY OF THE PRESENT INVENTIONS

The finding of the present invention is to provide melt-blown webs based on a polypropylene having a specific chain structure, which is shown in a specific chemical shift structure in the region of 4.6 to 4.9 ppm of a $^1$H NMR spectrum.

Additionally the polypropylene respectively the melt-blown web has a high level of total unsaturation.

Thus, the present invention is in a first aspect directed to melt-blown webs comprising melt-blown fibers made of at least 80 wt % of a polypropylene composition comprising (A) a polypropylene homo- or copolymer with a comonomer content of up to 12.0 wt %, (B) optionally a polymeric nucleating agent, wherein the melt-blown webs show an integral ratio [Rv], being defined as ratio of the integral value specifying the area under the peak with the chemical shift at 4.77 ppm of a $^1$H NMR spectrum to the integral value specifying the area under the peak with the chemical shift at 4.70 ppm $^1$H NMR spectrum, of 0.95 to 1.40, whereby the $^1$H NMR spectrum was determined by solution-state $^1$HNMR spectroscopy as described in the Experimental Part.

In a further aspect the melt-blown webs of the present invention comprising the melt-blown fibers made of at least 80 wt % of the visbroken polypropylene composition as defined above have a total unsaturation, being defined as sum of terminal vinylidene and internal vinylidene, of more than 28/100000 C atoms determined by solution-state $^1$HNMR spectroscopy as described in the Experimental Part.

According to a third aspect of the present invention the polypropylene, respectively the polypropylene composition is prepared by controlled radical polymerization processes (CRP) like Atom Transfer Radical Polymerization (ATRP) or Nitroxide-mediated Polymerization (NMP), or by visbreaking using a carbon based radical generator, a bis azo compound, a stable nitroxyl compound or a sterically hindered NO-acyl compound as radical initiator.

In a fourth aspect the invention is directed to melt-blown webs comprising melt-blown fibers made of at least 80 wt % of a visbroken polypropylene composition, wherein the polypropylene composition has been visbroken with at least one compound (C) being capable of thermally decomposing into carbon-based free radicals of formula (I) or (II) by breaking at least one single bond wherein in these formulas each of
$R_1$, $R_2$ and $R_3$, respectively $R_4$, $R_5$ and $R_6$ can be independently selected from hydrogen, substituted or unsubstituted straight chain, branched or cyclic saturated or mono-unsaturated hydrocarbons with 1 to 12 C-atoms, substituted or unsubstituted aromatic hydrocarbons with 5 to 12 C-atoms or carboxylate groups COOX, with X being a $C_1$-$C_6$-alkyl group,
whereby at least one of $R_1$, $R_2$ and $R_3$, respectively $R_4$, $R_5$ and $R_6$ is a substituted or unsubstituted aromatic hydrocarbon with 5 to 12 C-atoms,
wherein the amount of compound(s) (C) being added to the polypropylene composition for visbreaking is in the range of 0.01 to 10 wt % based on the polypropylene composition.

Such melt-blown webs, showing the characteristic chemical shifts with a specific integral ratio [Rv] and a high level of total unsaturation can be produced in a broad process window, i.e. up to 320° C., are free of shots and have improved barrier properties, i.e. better hydrohead values compared to melt-blown webs based on polypropylene materials which do not show these chemical shifts with a specific integral ratio and have in addition a lower level of total unsaturation.

BRIEF DESCRIPTION OF THE DRAWINGS

FIG. 3(a-b) shows the NMR spectra for 1E1-1 (FIG. 3a) and CE1-1 (FIG. 3b).

In the following the invention is described in more detail.

The polypropylene composition according to the present invention comprises as component (A) a propylene homopolymer or copolymer and as optional component (B) a polymeric nucleating agent.

Component (A): Polypropylene Polymer

As component (A) a polypropylene polymer is used. Suitable polypropylene polymers are polypropylene homopolymers or random propylene copolymers, including terpolymers.

According to the present invention the expression "propylene homopolymer" relates to a polypropylene that consists substantially, i.e. of at least 99.0 wt %, more preferably of at least 99.5 wt %, still more preferably of at least 99.8 wt %, like of at least 99.9 wt %, of propylene units. In another embodiment only propylene units are detectable, i.e. only propylene has been polymerized.

The expression "random propylene copolymer, including terpolymer" is preferably understood as a polypropylene comprising, preferably consisting of, units derivable from
(a) propylene
and
(b) ethylene and/or $C_4$ to $C_{12}$ α-olefins.

Thus the propylene copolymer—or terpolymer according to this invention preferably comprises monomers co-polymerizable with propylene, for example comonomers such as ethylene and/or $C_4$ to $C_{12}$ α-olefins, in particular ethylene and/or $C_4$ to C α-olefins, e.g. 1-butene and/or 1-hexene. Preferably the propylene copolymer or terpolymer according to this invention comprises, especially consists of, monomers co-polymerizable with propylene from the group consisting of ethylene, 1-butene and 1-hexene. More specifically the propylene copolymer or terpolymer of this invention comprises—apart from propylene—units derivable from ethylene and/or 1-butene. In a preferred embodiment the propylene copolymer according to this invention comprises units derivable only from ethylene and propylene.

The propylene copolymer or terpolymer has a comonomer content up to 12.0 wt %, preferably the comonomer content of the propylene copolymer or terpolymer is in the range of 1.0 to 10.0 wt %.

More preferably the propylene copolymer is a copolymer of propylene and only one comonomer as defined above, whereby the comonomer content is in the range of 1.0 to below 5.0 wt % and even more preferably in the range of 1.5 to 4.0 wt %.

One requirement of the polypropylene polymer (respectively composition) is a melt flow rate $MFR_2$ (230° C./2.16 kg) measured according to ISO 1133 in the range of 20 to 5000 g/10 min, preferably in the range of 30 to 3000 g/10 min, more preferably in the range of 150 to 2500 g/10 min, yet more preferably in the range of 400 and 2000 g/10 min.

Thus the polypropylene polymer (respectively composition) has a molecular weight $M_w$ (measured with GPC) of below 180 000 g/mol, preferably below 160 000 g/mol, more preferably below 150 000 g/mol and most preferably below 140 000 g/mol.

The polypropylene polymer (respectively the composition) suitable for the present invention can be produced by any known technology being able to produce polypropylene polymers with the required melt flow rate $MFR_2$ (230° C./2.16 kg).

Preferably the polypropylene polymer (respectively the composition) is produced by controlled radical polymerization processes (CRP), like Atom Transfer Radical Polymerization (ATRP) or Nitroxide-mediated Polymerization (NMP), or by visbreaking using a carbon based radical generator, a bis azo compound, a stable nitroxyl compound or a sterically hindered NO-acyl compound as radical initiator.

More preferably the polypropylene polymer (respectively the composition) is visbroken using the above mentioned radical initiators.

Even more preferably the polypropylene polymer (respectively the composition) is visbroken using carbon based radical generators.

If the polypropylene polymer (respectively the composition) is prepared by visbreaking, the melt flow rate (230° C./2.16 kg) of the polypropylene polymer (respectively composition) before visbreaking is much lower, like from 2 to 500 g/10 min, than after visbreaking. For example, the melt flow rate (230° C./2.16 kg) of the polypropylene polymer (respectively composition) before visbreaking is from 3 to 450 g/10 min, like from 5 to 400 g/10 min.

Preferably the polypropylene polymer (respectively composition) has been visbroken with a visbreaking ratio [final $MFR_2$ (230° C./2.16 kg)/initial $MFR_2$ (230° C./2.16 kg)] of 5 to 50, wherein "final $MFR_2$ (230° C./2.16 kg)" is the $MFR_2$ (230° C./2.16 kg) of the polypropylene polymer (respectively composition) after visbreaking and "initial $MFR_2$ (230° C./2.16 kg)" is the $MFR_2$ (230° C./2.16 kg) of the polypropylene polymer (respectively composition) before visbreaking.

More preferably, the polypropylene polymer (respectively composition) has been visbroken with a visbreaking ratio [final $MFR_2$ (230° C./2.16 kg)/initial $MFR_2$ (230° C./2.16 kg)] of 5 to 25. Even more preferably, the polypropylene polymer (respectively composition) has been visbroken with a visbreaking ratio [final $MFR_2$ (230° C./2.16 kg)/initial $MFR_2$ (230° C./2.16 kg)] of 5 to 15.

Preferred mixing devices suited for visbreaking are known to an art skilled person and can be selected i.a. from discontinuous and continuous kneaders, co- or counter-rotating, twin screw extruders, single screw extruders with special mixing sections and co-kneaders and the like.

The visbreaking step according to the present invention is performed with a carbon based radical generator, a bis azo compound, a stable nitroxyl compound or a sterically hindered NO-acyl compound as radical initiator.

Preferably carbon-based free radicals are used for the visbreaking step.

More preferably the visbreaking step is performed with at least one compound (C) being capable of thermally decomposing into carbon-based free radicals by breaking at least one single bond, like a carbon-carbon single bond or a carbon-hydrogen bond.

The carbon-based free radicals have the formula (I) or (II)

In these formulas each of $R_1$, $R_2$ and $R_3$, respectively $R_4$, $R_5$ and $R_6$ can be independently selected from hydrogen, substituted or unsubstituted straight chain, branched or cyclic saturated or mono-unsaturated hydrocarbons with 1 to 12 C-atoms, substituted or unsubstituted aromatic hydrocarbons with 5 to 12 C-atoms or carboxylate groups COOX, with X being a $C_1$-$C_6$-alkyl group, whereby at least one of $R_1$, $R_2$ and $R_3$, respectively $R_4$, $R_5$ and $R_6$ is a substituted or unsubstituted aromatic hydrocarbon with 5 to 12 C-atoms.

Figure 1:
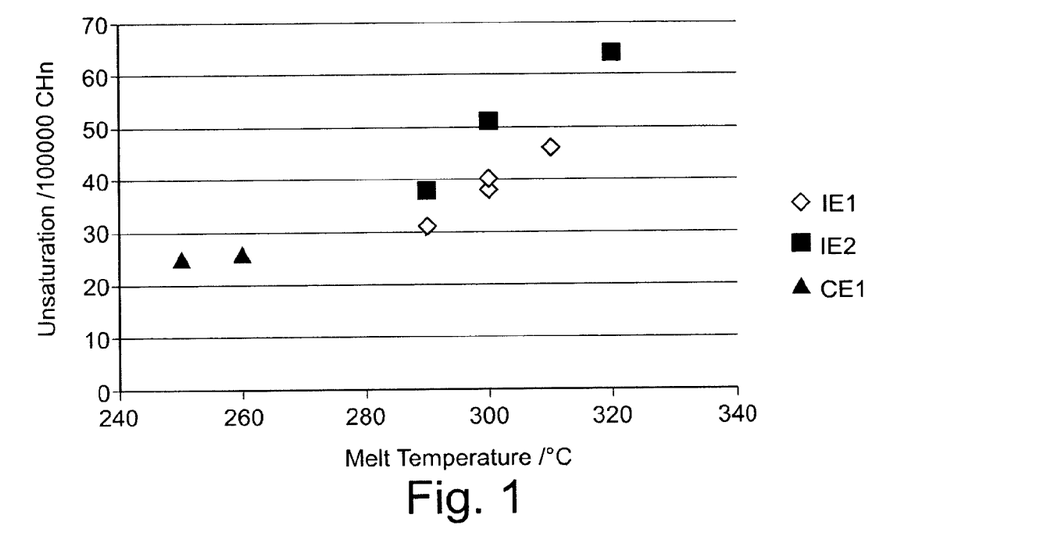
FIG. 1 illustrates unsaturation level (Unsaturation/100000 CHn) versus melt temperature (° C.) for preparing the webs for IE1, 1E2, and CE1.

Suitable carbon-based free radicals of formula (I) or (II) are known for example from Chemicals Reviews, 2014, 114, p 5013, FIG. 1, radicals R1 to R61.

Preferably each of $R_1$ and $R_3$, respectively $R_4$ and $R_6$ can be independently selected from the group consisting of hydrogen, substituted and unsubstituted straight, branched and cyclic hydrocarbons with 1 to 12 C-atoms and substituted and unsubstituted aromatic hydrocarbons with 5 to 12 C-atoms, and $R_2$, respectively $R_5$ can be selected from the group consisting of substituted and unsubstituted straight, branched and cyclic hydrocarbons with 1 to 12 C-atoms and substituted and unsubstituted aromatic hydrocarbons with 5 to 12 C-atoms.

As stated above at least one of the groups $R_1$, $R_2$ or $R_3$, respectively $R_4$, $R_5$ and $R_6$ is a substituted or unsubstituted aromatic hydrocarbons with 5 to 12 C-atoms The carbon-based free radicals of formula (I) or (II) being suitable in the present invention are thus preferably generated from one or more compounds (C) of the formula (III)

wherein each of $R_1$, $R_3$, $R_4$ and $R_6$ independently is selected from the group consisting of hydrogen, substituted and unsubstituted straight, branched, and cyclic, hydrocarbons with 1 to 12 C-atoms and substituted and unsubstituted aromatic hydrocarbons with 5 to 12 C-atoms, and each of $R_2$ and $R_5$ independently is selected from the group consisting of substituted and unsubstituted straight, branched, and cyclic hydrocarbons with 1 to 12 C-atoms and substituted and unsubstituted aromatic hydrocarbons with 5 to 12 C-atoms and wherein at least one of $R_1$, $R_2$, $R_3$, $R_4$, $R_5$ and $R_6$ is a substituted or unsubstituted aromatic hydrocarbon with 5 to 12 C-atoms.

The compound (C) of formula (III) can have a symmetrical as well as an asymmetrical structure.

More preferably each of $R_2$ and $R_5$ independently is selected from a substituted or unsubstituted aromatic hydrocarbon with 5 to 12 C-atoms and yet more preferably from the group consisting of substituted and unsubstituted aryl groups with 6 to 10 C-atoms and each of $R_1$, $R_3$, $R_4$ and $R_6$ independently is selected from the group consisting of hydrogen and $C_1$-$C_6$ alkyl groups.

Even more preferred the compounds (C) have the formula (IV)

wherein each of $R_y$, $R_8$, $R_9$ and $R_{10}$ independently is selected from a group consisting of hydrogen atom, $C_{1-6}$ alkyl groups, $C_{12}$ alkoxy groups, a nitrile group and a halogen atom, and wherein each of $R_1$, $R_3$, $R_4$ and $R_6$ independently is selected from group consisting of hydrogen and $C_{1-6}$ alkyl groups.

In a still more preferred embodiment said compound (C) is selected from the group consisting of 2,3-dimethyl-2,3-diphenylbutane, 2,3-dipropyl-2,3-diphenylbutane, 2,3-dibutyl-2,3-diphenylbutane, 2,3-dihexyl-2,3-diphenylbutane, 2-methyl-3-ethyl-2,3-diphenylbutane, 2-methyl-2,3-diphenylbutane, 2,3-diphenylbutane, 2,3-dimethyl-2,3-di-(p-methoxyphenyl)-butane, 2,3-dimethyl-2,3-di-(p-methylphenyl)-butane, 2,3-dimethyl-2-methylphenyl-3-(p-2'3'-dimethyl-3'-methylphenyl-butyl)-phenyl-butane, 3,4-dimethyl-3,4-diphenylhexane, 3,4-diethyl-3,4-diphenylhexane, 3,4-dipropyl-3,4-diphenylhexane, 4,5-dipropyl-4,5-diphenyloctane, 2,3-diisobutyl-2,3-diphenylbutane, 3,4-diisobutyl-3,4-5-diphenylhexane, 2,3-dimethyl-2,3-di-p(t-butyl)-phenyl-butane,5,6-dimethyl-5,6-diphenyldecane, 6,7-dimethyl-6,7-diphenyldodecane, 7,8-dimethyl-7,8-di(methoxyphenyl)-tetra-decane, 2,3-diethyl-2,3-diphenylbutane, 2,3-dimethyl-2,3-di(p-chlorophenyl) butane, 2,3-dimethyl-2,3-di(p-iodophenyl)butane, and 2,3-dimethyl-2,3-di(p-nitrophenyl) butane.

Most preferably compound (C) is selected from the group consisting of 2,3-dimethyl-2,3-diphenylbutane and 3,4-dimethyl-3,4-diphenylhexane.

According to the present invention at least one of the above described compounds (C) is added for visbreaking the PP. It is therefore also possible to add two or more of the above described compounds (C).

The amount of the at least one compound (C) which is added to the polypropylene polymer is in the range of 0.01 to 10 wt % of the polypropylene composition, preferably 0.05 to 5.0 wt %, more preferably 0.08 to 2.5 wt %.

Typically, visbreaking in accordance with the present invention is carried out in an extruder, so that under the suitable conditions, an increase of melt flow rate is obtained. During visbreaking, higher molar mass chains of the starting product are broken statistically more frequently than lower molar mass molecules, resulting as indicated above in an overall decrease of the average molecular weight and an increase in melt flow rate.

After visbreaking the polypropylene polymer (respectively composition) according to this invention is preferably in the form of pellets or granules.

Unless otherwise indicated, throughout the instant invention, the melting behaviour, xylene cold soluble content (XCS), isotacticity and the amount of <2,1> regiodefects as defined below for the polypropylene composition and the propylene homopolymer or propylene copolymer, respectively, is preferably the melting/crystallization behaviour, xylene cold soluble content (XCS), isotacticity and the amount of <2,1> regiodefects of the polypropylene composition and the propylene homopolymer or propylene copolymer, respectively, after visbreaking.

Ad Propylene Homopolymer:

Preferably the propylene homopolymer is isotactic. Accordingly, it is preferred that the polypropylene homopolymer has a rather high pentad concentration (mmmm %) i.e. more than 90.0%, more preferably more than 93.0%, like more than 93.0 to 98.5%, still more preferably at least 93.5%, like in the range of 93.5 to 98.0%.

It is preferred that the propylene homopolymer is featured by rather high cold xylene soluble (XCS) content, i.e. by a xylene cold soluble (XCS) of at least 1.8 wt %, like at least 2.0 wt %. Accordingly, the propylene homopolymer has preferably a xylene cold soluble content (XCS) in the range of 1.8 to 5.5 wt %, more preferably in the range of 2.0 to 5.0 wt %.

The amount of xylene cold solubles (XCS) additionally indicates that the propylene homopolymer is preferably free of any elastomeric polymer component, like an ethylene propylene rubber. In other words, the propylene homopolymer shall be not a heterophasic polypropylene, i.e. a system consisting of a polypropylene matrix in which an elastomeric phase is dispersed. Such systems are featured by a rather high xylene cold soluble content. The propylene homopolymer suitable for the composition of this invention has no glass transition temperature below −30° C., preferably below −25° C., more preferably below −20° C.

In one preferred embodiment the propylene homopolymer suitable for the composition of this invention has a glass transition temperature in the range of −12° C. to 5° C., more preferably in the range of −10° C. to 4° C.

Further, the propylene homopolymer is preferably a crystalline propylene homopolymer. The term "crystalline" indicates that the propylene homopolymer has a rather high melting temperature. Accordingly throughout the invention the propylene homopolymer is regarded as crystalline unless otherwise indicated. Therefore, the propylene homopolymer has a melting temperature Tm measured by differential scanning calorimetry (DSC) in the range of ≥150° C. and ≤170° C., preferably in the range of 155° C. to 166° C.

Further it is preferred that the propylene homopolymer has a crystallization temperature Tc measured by differential scanning calorimetry (DSC) of equal or more than 110° C., more preferably in the range of 110° C. to 135° C., more preferably in the range of 114° C. to 130° C. Preferably, the propylene homopolymer is obtained by polymerizing propylene in the presence of a Ziegler-Natta catalyst as defined below. More preferably, the propylene homopolymer according to this invention is obtained by a process as defined in detail below by using the Ziegler-Natta catalyst.

Additionally the propylene homopolymer has a molecular weight distribution (MWD) >2, like in the range from 2.1 to 10, preferably from 2.5 to 9, more preferably from 2.8 to 8.0.

Ad Propylene Copolymer- or Terpolymer

The propylene copolymer or terpolymer suitable according to this invention is preferably monophasic. Accordingly it is preferred that the propylene copolymer or terpolymer does not contain elastomeric (co)polymers forming inclusions as a second phase for improving mechanical properties. A polymer containing elastomeric (co)polymers as insertions of a second phase would by contrast be called heterophasic and is not part of the present invention. The presence of second phases or the so called inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Accordingly it is preferred that the propylene copolymer or terpolymer according to this invention has no glass transition temperature below −30° C., preferably below −25° C., more preferably below −20° C.

On the other hand, in one preferred embodiment the propylene copolymer or terpolymer according to this invention has a glass transition temperature in the range of −12 to +2° C., more preferably in the range of −10 to +2° C.

Further the propylene copolymer or terpolymer has a main melting temperature, i.e. a melting temperature representing more than 50% of the melting enthalpy, of at least 125° C., more preferably in the range of 127 to 155° C., still more preferably in the range of 130 to 152° C.

Further it is preferred that the propylene copolymer or terpolymer has a crystallization temperature of at least 110° C., more preferably in the range of 110 to 128° C., still more preferably in the range of 112 to 126° C., like in the range of 114 to 124° C.

Preferably, the propylene copolymer or terpolymer has a xylene cold soluble fraction (XCS) in the range of 3.0 to 25.0 wt %, preferably in the range of 4.5 to 20.0 wt %, more preferably in the range of 5.0 to 15.0 w %.

Preferably the propylene copolymer or terpolymer has a molecular weight distribution (Mw/Mn) of higher than 2.0, more preferably in the range of 2.1 to 6.0, still more preferably in the range of 2.5 to 5.5, like in the range of 3.1 to 5.3.

Summing up suitable polypropylene polymers have a melting temperature of ≥125° C. to ≤170° C. and a molecular weight distribution (MWD) >2.0.

Preferably the polypropylene polymers according to the present invention are propylene homopolymers or copolymers, more preferably propylene homopolymers.

The polypropylene polymer according to this invention is preferably produced in the presence of
(a) a Ziegler-Natta catalyst (ZN-C) comprising compounds (TC) of a transition metal of Group 4 to 6 of IUPAC, a Group 2 metal compound (MC) and an internal donor (ID),
(b) optionally a co-catalyst (Co), and
(c) optionally an external donor (ED).

Preferably, the polypropylene polymer is prepared by a polymerization process as further described below comprising at least one reactor (R1) and optionally a second reactor (R2), wherein in the first reactor (R1) the first polypropylene polymer fraction (PP1) is produced which is optionally subsequently transferred into the optional second reactor (R2), whereby in the second reactor (R2) the optional second polypropylene polymer fraction (PP2) is produced in the presence of the first polypropylene polymer fraction (PP1).

The process for the preparation of the polypropylene polymer as well as the Ziegler-Natta catalyst (ZN-C) used in said process, are further described in detail below.

As already indicated above, the polypropylene polymer is optionally produced in a sequential polymerization process.

The term "sequential polymerization system" indicates that the polypropylene polymer is produced in at least two reactors connected in series. Accordingly, the polymerization system for sequential polymerization comprises at least a first polymerization reactor (R1) and a second polymerization reactor (R2), and optionally a third polymerization reactor (R3). The term "polymerization reactor" shall indicate that the main polymerization takes place. Thus, in case the process consists of two polymerization reactors, this definition does not exclude the option that the overall system comprises for instance a pre-polymerization step in a pre-polymerization reactor. The term "consist of" is only a closing formulation in view of the main polymerization reactors.

Preferably the first polymerization reactor (R1) is, in any case, a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The optional second polymerization reactor (R2) can be either a slurry reactor (SR), as defined above, preferably a loop reactor (LR) or a gas phase reactor (GPR).

The optional third polymerization reactor (R3) is preferably a gas phase reactor (GPR).

Suitable sequential polymerization processes are known in the state of the art.

A preferred multistage process is a "loop-gas phase"-process, such as developed by Borealis (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

It is within the skill of art skilled persons to choose the polymerization conditions in a way to yield the desired properties of the polypropylene polymer.

The Ziegler-Natta Catalyst (ZN-C), the External Donor (ED) and the Co-Catalyst (Co)

In the process described above a Ziegler-Natta catalyst (ZN-C) for the preparation of the polypropylene polymer is applied. This Ziegler-Natta catalyst (ZN-C) can be any stereo-specific Ziegler-Natta catalyst (ZN-C) for propylene polymerization, which preferably is capable of catalysing the polymerization and copolymerization of propylene and optional comonomers at a pressure of 500 to 10000 kPa, in particular 2500 to 8000 kPa, and at a temperature of 40 to 110° C., in particular of 60 to 110° C.

Preferably, the Ziegler-Natta catalyst (ZN-C) comprises a high-yield Ziegler-Natta type catalyst including an internal donor component, which can be used at high polymerization temperatures of 80° C. or more.

Such high-yield Ziegler-Natta catalyst (ZN-C) can comprise a succinate, a diether, a phthalate etc., or mixtures therefrom as internal donor (ID) and are for example commercially available from LyondellBasell under the Avant ZN trade name.

Examples of the Avant ZN series are Avant ZN 126 and Avant ZN 168. Avant ZN 126 is a Ziegler-Natta catalyst with 3.5 wt % titanium and a diether compound as internal electron donor, which is commercially available from LyondellBasell. Avant ZN 168 is a Ziegler-Natta catalyst with 2.6 wt % titanium and a succinate compound as internal electron donor, which is commercially available from LyondellBaselll.

A further example of the Avant ZN series is the catalyst ZN180M of LyondellBasell.

Additional suitable catalysts are described for example in WO 2012/007430, EP2610271, EP 261027 and EP2610272

The Ziegler-Natta catalyst (ZN-C) is preferably used in association with an alkyl aluminum cocatalyst and optionally external donors.

As further component in the instant polymerization process an external donor (ED) is preferably present. Suitable external donors (ED) include certain silanes, ethers, esters, amines, ketones, heterocyclic compounds and blends of these. It is especially preferred to use a silane. It is most preferred to use silanes of the general formula wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$, or of general formula wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^1$ and $R^2$ are the same, yet more preferably both $R^3$ and $R^4$ are an ethyl group.

Especially preferred external donors (ED) are the dicyclopentyl dimethoxy silane donor (D-donor) or the cyclohexylmethyl dimethoxy silane donor (C-Donor).

In addition to the Ziegler-Natta catalyst (ZN-C) and the optional external donor (ED) a co-catalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst (Co) is a trialkylaluminium, like triethylaluminium (TEAL), dialkyl aluminium chloride or alkyl aluminium dichloride or mixtures thereof. In one specific embodiment the co-catalyst (Co) is triethylaluminium (TEAL).

Preferably the ratio between the co-catalyst (Co) and the external donor (ED) [Co/ED] and/or the ratio between the co-catalyst (Co) and the transition metal (TM) [Co/TM] should be carefully chosen.

Accordingly, (a) the mol-ratio of co-catalyst (Co) to external donor (ED) [Co/ED] must be in the range of 5 to 45, preferably is in the range of 5 to 35, more preferably is in the range of 5 to 25; and optionally (b) the mol-ratio of co-catalyst (Co) to titanium compound (TC) [Co/TC] must be in the range of above 80 to 500, preferably is in the range of 100 to 350, still more preferably is in the range of 120 to 300.

Component (B): Polymeric Nucleating Agent

As optional component (B) a polymeric nucleating agent, preferably a polymer of vinyl compound, more preferably a polymeric nucleating agent obtainable by polymerizing vinylcycloalkane monomers or vinylalkane monomers can be used.

The polymeric nucleating agent is more preferably a polymerized vinyl compound according to the following formula wherein $R^{11}$ and $R^{12}$ together form a 5- or 6-membered saturated, unsaturated or aromatic ring, optionally containing substituents, or independently represent an alkyl group comprising 1 to 4 carbon atoms, whereby in case $R^{11}$ and $R^{12}$ form an aromatic ring, the hydrogen atom of the —CHR$^1$R$^2$ moiety is not present.

Even more preferably, the polymeric nucleating agent is selected from: vinyl cycloalkane polymer, preferably vinyl cyclohexane (VCH) polymer, vinyl cyclopentane polymer, 3-methyl-1-butene polymer and vinyl-2-methyl cyclohexane polymer. The most preferred nucleating agent is vinyl cyclohexane (VCH) polymer.

As mentioned above, in a preferred embodiment, nucleating agent is a polymeric nucleating agent, more preferably a polymer of vinyl compound according to the formula as defined above, even more preferably vinyl cyclohexane (VCH) polymer.

The amount of nucleating agent preferably is not more than 10000 ppm by weight (means parts per million based on the total weight of the polypropylene composition (100 wt %), also abbreviated herein shortly as ppm), more preferably not more than 6000 ppm, even more preferably not more than 5000 ppm, based on the total weight of the polypropylene composition (100 wt %).

The amount of the nucleating agent still more preferably is not more than 500 ppm, preferably is from 0.025 to 200 ppm, and more preferably is from 0.1 to 200 ppm, more preferably is from 0.3 to 200 ppm, most preferably is from 0.3 to 100 ppm, based on the total weight of the polypropylene composition (100 wt %).

In the preferred embodiment the nucleating agent is a polymeric nucleating agent, most preferably a polymer of vinyl compound according to formula (III) as defined above, even more preferably vinyl cyclohexane (VCH) polymer as defined above, and the amount of said nucleating agent (B) is not more than 200 ppm, more preferably is from 0.025 to 200 ppm, and more preferably is from 0.1 to 200 ppm, more preferably is from 0.3 to 200 ppm, most preferably is from 0.3 to 100 ppm, based on the total weight of the polypropylene composition (100 wt %).

The nucleating agent may be introduced to the polypropylene polymer (A) e.g. during the polymerization process of the polypropylene polymer (A) or may be incorporated to the polypropylene polymer (A) by mechanical blending with a nucleated polymer, containing the polymeric nucleating agent (so-called master batch technology) or by mechanical blending of the polypropylene polymer (A) with the nucleating agent as such.

Thus, the nucleating agent can be introduced to the polypropylene polymer (A) during the polymerization process of the polypropylene polymer (A). The nucleating agent is preferably introduced to the polypropylene polymer (A) by first polymerizing the above defined vinyl compound according to formula (II) as defined above, even more preferably vinyl cyclohexane (VCH), in the presence of a catalyst system as described above, comprising a solid Ziegler Natta catalyst component, a cocatalyst and optional external donor, and the obtained reaction mixture of the polymer of the vinyl compound according to formula (III) as defined above, even more preferably vinyl cyclohexane (VCH) polymer, and the catalyst system is then used for producing the polypropylene polymer (A).

The polymerization of the vinyl compound, e. g. VCH, can be done in any inert fluid that does not dissolve the polymer formed (e. g. polyVCH). It is important to make sure that the viscosity of the final catalyst/polymerized vinyl compound/inert fluid mixture is sufficiently high to prevent the catalyst particles from settling during storage and transport.

The adjustment of the viscosity of the mixture can be done either before or after the polymerization of the vinyl compound. It is, e. g., possible to carry out the polymerization in a low viscosity oil and after the polymerization of the vinyl compound the viscosity can be adjusted by addition of a highly viscous substance. Such highly viscous substance can be a "wax", such as an oil or a mixture of an oil with a solid or highly viscous substance (oil-grease). The viscosity of such a viscous substance is usually 1,000 to 15,000 cP at room temperature. The advantage of using wax is that the catalyst storing and feeding into the process is improved. Since no washing, drying, sieving and transferring are needed, the catalyst activity is maintained.

The weight ratio between the oil and the solid or highly viscous polymer is preferably less than 5:1.

In addition to viscous substances, liquid hydrocarbons, such as isobutane, propane, pentane and hexane, can also be used as a medium in the modification step.

The polypropylenes produced with a catalyst modified with polymerized vinyl compounds contain essentially no free (unreacted) vinyl compounds. This means that the vinyl compounds shall be completely reacted in the catalyst modification step.

Further, the reaction time of the catalyst modification by polymerization of a vinyl compound should be sufficient to allow for complete reaction of the vinyl monomer, i. e. the polymerization is continued until the amount of unreacted vinyl compounds in the reaction mixture (including the polymerization medium and the reactants) is less than 0.5 wt %, in particular less than 2000 ppm by weight (shown by analysis). Thus, when the pre-polymerized catalyst contains a maximum of about 0.1 wt % vinyl compound, the final vinyl compound content in the polypropylene will be below the limit of determination using the GC-MS method (<0.01 ppm by weight). Generally, when operating on an industrial scale, a polymerization time of at least 30 minutes is required, preferably the polymerization time is at least 1 hour and in particular at least 5 hours. Polymerization times even in the range of 6 to 50 hours can be used. The modification can be done at temperatures of 10 to 70° C., preferably 35 to 65° C.

This catalyst modification step is known as BNT-technology and is performed during the above described pre-polymerization step in order to introduce the polymeric nucleating agent.

General preparation of such modified catalyst system vinyl compound (II) is disclosed e.g. in EP 1 028 984 or WO 00/6831.

In another embodiment the polymeric nucleating agent is added with the so called masterbatch technology, where an already nucleated polymer, preferably a propylene homopolymer, containing the polymeric nucleating agent (masterbatch) is blended with the polypropylene polymer (A).

Such a masterbatch is preferably prepared by polymerizing propylene in a sequential polymerization process.

The term "sequential polymerization system" indicates that the propylene homopolymer is produced in at least two reactors connected in series. Accordingly, the present polymerization system comprises at least a first polymerization reactor (R1) and a second polymerization reactor (R2), and optionally a third polymerization reactor (R3). The term "polymerization reactor" shall indicate that the main polymerization takes place. Thus, in case the process consists of two polymerization reactors, this definition does not exclude the option that the overall system comprises for instance a pre-polymerization step in a pre-polymerization reactor. The term "consist of" is only a closing formulation in view of the main polymerization reactors.

The produced propylene homopolymer, containing the polymeric nucleating agent, is the so called carrier polymer.

If the nucleating agent is added in the form of a masterbatch together with a carrier polymer, the concentration of the nucleating agent in the masterbatch is at least 10 ppm, typically at least 15 ppm. Preferably this nucleating agent is present in the masterbatch in a range of from 10 to 2000 ppm, more preferably more than 15 to 1000 ppm, such as 20 to 500 ppm.

As described above, the carrier polymer is preferably a propylene homopolymer, produced with a catalyst system as described above for component (A) and having an $MFR_2$ (230° C., 2.16 kg) in the range of 1.0 to 800 g/10 min, preferably 1.5 to 500 g/10 min, more preferably 2.0 to 200 g/10 min and most preferably 2.5 to 150 g/10 min.

More preferably, the carrier polymer is an isotactic propylene homopolymer having a melting point very similar to the above defined propylene homopolymer as component (A). Therefore, the carrier polymer has a melting temperature Tm measured by differential scanning calorimetry (DSC) of equal or more than 150° C., i.e. of equal or more than 150 to 168° C., more preferably of at least 155° C., i.e. in the range of 155 to 166° C.

If the nucleating agent is added in the form of a masterbatch, the amount of masterbatch added is in the range of 1.0 to 10 wt %, preferably 1.5 to 8.5 wt % and more preferably 2.0 to 7.0 wt %, based on the total weight of the polypropylene composition.

Polypropylene Composition

The inventive polypropylene composition comprises the above defined polypropylene polymer as component (A) and optionally the above defined polymeric nucleating agent as component (B).

Preferably the inventive polypropylene composition comprises as polypropylene polymer (A) a propylene homopolymer or a copolymer, more preferably a homopolymer, as described above.

Values concerning melt flow rate ($MFR_2$) and xylene cold soluble content (XCS), as defined above for the polypropylene polymer are equally applicable for the polypropylene composition.

The same is true for the melting temperature of the polypropylene polymer which is also equally applicable for the polypropylene composition.

The crystallization temperature of a nucleated polypropylene composition is higher than the crystallization temperature of the polypropylene polymer used as component (A), if the polymeric nucleating agent is added to the polypropylene polymer in the form of a masterbatch after the polymerization process for producing the polypropylene polymer.

If the polymeric nucleating agent is introduced to the polypropylene polymer by the use of a catalyst system modified by the BNT-technology as described above, the crystallization temperature of the polypropylene polymer is also equally applicable for the polypropylene composition.

The polypropylene composition of the present invention may comprise further components. However, it is preferred that the inventive polypropylene composition comprises as polymer components only the polypropylene polymer as defined in the instant invention. Accordingly, the amount of polypropylene polymer may not result in 100.0 wt % based on the total polypropylene composition. Thus, the remaining part up to 100.0 wt % may be accomplished by further additives known in the art. However, this remaining part shall be not more than 5.0 wt %, like not more than 3.0 wt % within the total polypropylene composition; not including the amount of the optional masterbatch for introducing the polymeric nucleating agent. For instance, the inventive polypropylene composition may comprise additionally small amounts of additives selected from the group consisting of antioxidants, stabilizers, fillers, colorants, nucleating agents and antistatic agents. In general, they are incorporated during granulation of the pulverulent product obtained in the polymerization. Accordingly, the polypropylene polymer constitutes at least to 95.0 wt %, more preferably at least 97.0 wt % to the total polypropylene composition.

In case the polypropylene polymer comprises another α-nucleating agent than the polymeric nucleating agent such alternative or complementary α-nucleating agents are preferably selected from the group comprising
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and
(iii) salts of diesters of phosphoric acid, e.g. sodium 2,2'-methylenebis (4, 6,-di-tert-butylphenyl) phosphate or aluminium-hydroxy-bis[2,2'-methylene-bis(4,6-di-t-butylphenyl)phosphate], and
(iv) mixtures thereof.

Such additives are generally commercially available and are described, for example, in "Plastic Additives Handbook", pages 871 to 873, 5th edition, 2001 of Hans Zweifel.

The instant polypropylene composition is preferably used in pellet or granule form for the preparation of the melt-blown fibers and subsequently to the melt-blown web or article according to the invention.

Thus, the above described polypropylene composition is used for preparing melt-blown fibers. Such melt-blown fibers have an average filament fineness of not more than 5 μm.

Furthermore, the melt-blown fibers comprise at least 80.0 wt %, preferably at least 85.0 wt %, more preferably at least 90.0 wt %, still more preferably at least 95.0 wt % based on the total weight of the melt-blown fibers, most preferably consist of, of the polypropylene composition as defined above.

Thus a further component may be present in the melt-blown fibers according to the invention. Such further component is a further polymer, which is preferably also a polypropylene based polymer.

It is within the skill of an art skilled person to choose a suitable additional polymer in a way that the desired properties of the melt-blown webs are not affected negatively.

The present invention is directed to melt-blown webs (MBW), made of these melt-blown fibers. Accordingly the present invention is also directed to a melt-blown web comprising the melt-blown fibers made of the polypropylene composition as defined above.

Further, the present invention is also directed to an article selected from the group consisting of filtration media (filter), diapers, sanitary napkins, panty liners, incontinence products for adults, protective clothing, surgical drapes, surgical gown, and surgical wear in general, comprising the melt-blown web (MBW) according to the present invention, preferably in an amount of at least 80.0 wt %, more preferably in an amount of at least 95.0 wt %, based on the total weight of the article. In one embodiment of the present invention, the article consists of the melt-blown web (MBW).

The weight per unit area of the melt-blown web depends very much on the end use, however it is preferred that the melt-blown web has a weight per unit area of at least 1 g/m², preferably in the range from 1 to 250 g/m².

In case the melt-blown web according to the instant invention is produced as a single layer web (e.g. for air filtration purposes) it has a weight per unit area of at least 1 g/m², more preferably of at least 4 g/m², yet more preferably in the range of 7 to 250 g/m², still more preferably in the range of 8 to 200 g/m².

In case the melt-blown web according to the instant invention is produced as one part of a multi-layer construction like an SMS-web comprising, preferably consisting of, a spunbonded web layer, a melt-blown web layer and another spunbonded web layer (e.g. for hygienic application), the melt-blown web has a weight per unit area of at least 0.8 g/m², more preferably of at least 1 g/m², yet more preferably in the range of 1 to 30 g/m², still more preferably in the range of 1.3 to 20 g/m². Alternatively, the multi-layer construction can also include a multiplicity of melt-blown web layers and spunbonded web layers, such as a SSMMS construction.

The melt-blown web according to the invention being as a single layer web or a multi-layer construction as described above containing the melt-blown web can be furthermore combined with other layers, i.e. polycarbonate layers or the like, depending on the desired end use of the produced article.

The melt-blown webs according to the present invention have a hydrohead (3rd drop, cm H2O resp. mbar), measured according to standard test WSP 80.6 (09), of a melt-blown web (produced with 290° C. melt temperature) having a weight per unit area of 9.5±1.0 g/m2, of at least 60 mbar, preferably of at least 70 mbar, and of a melt-blown web (produced with 300° C. melt temperature) having a weight per unit area of 9.5±1.0 g/m2, of at least 65 mbar, preferably at least 75 mbar.

Surprisingly the inventors found that the higher the total unsaturation level is, the higher the hydrohead (3rd drop, cm H2O resp. mbar) is.

Using the above described polypropylene composition for producing the webs according to the invention allows the use of a much broader process window, compared to polypropylene composition according to the state of the art, e.g. visbroken by peroxides.

The process window being applicable for producing melt-blown webs according to the invention is from 260° C. to 320° C., preferably from 270° C. to 320° C. and more preferably from 280° C. to 310° C.

A further advantage of the fact that process temperatures up to 320° C. are suitable for producing melt-blown webs according to the invention is that higher process temperatures further reduce the viscosity, which provides the chance of producing finer fibres to further improve the properties of the webs.

The melt-blown webs according to the present invention are further characterized by a ratio of the integral value [Rv] specifying the area under the peak with the chemical shift at 4.77 ppm of a ¹H NMR spectrum to the integral value specifying the area under the peak with the chemical shift at 4.70 ppm ¹H NMR spectrum, of 0.95 to 1.40, whereby the $^1$H NMR spectrum was determined by solution-state $^1$H-NMR spectroscopy as described in the Experimental Part.

Preferably this ratio is between 0.95 and 1.35, more preferably between 0.95 and 1.30 and most preferably this ratio is between 0.95 and 1.20.

Melt-blown webs being produced from polypropylene composition which are visbroken by peroxides do not show this characteristic.

In addition it is preferred that the melt-blown webs according to the present invention are further characterized by a total unsaturation level, being defined as sum of terminal vinylidene and internal vinylidene, of more than 28/100000 C atoms (as determined by solution-state $^1$H-NMR spectroscopy as described in the Experimental Part). Preferably the total unsaturation level is at least 30/100000 C, more preferably of at least 35/100000 C and up to 80/100000 C, preferably up to 75/100000 C and more preferably up to 70/100000 C.

Total unsaturation means the sum of [terminal vinylidene] and [internal vinylidene] groups in the isolated polymer in terminal vinylidene/100000 carbon atoms respectively internal vinylidene/100000 carbon atoms as determined by solution-state $^1$H-NMR spectroscopy.

EXPERIMENTAL PART

A. Measuring Methods

The following definitions of terms and determination methods apply for the above general description of the invention including the claims as well as to the below examples unless otherwise defined.

Quantification of Microstructure by NMR Spectroscopy

Quantitative nuclear-magnetic resonance (NMR) spectroscopy was used to quantify the content of unsaturated groups present in the polymers.

Quantitative $^1$H NMR spectra recorded in the solution-state using a Bruker Advance III 400 NMR spectrometer operating at 400.15 MHz. All spectra were recorded using a $^{13}$C optimised 10 mm selective excitation probehead at 125° C. using nitrogen gas for all pneumatics. Approximately 250 mg of material was dissolved in 1,2-tetrachloroethane-$d_2$ (TCE-$d_2$) using approximately 3 mg of Hostanox 03 (CAS 32509-66-3) as stabiliser. Standard single-pulse excitation was employed utilising a 30 degree pulse, a relaxation delay of 5 s and 10 Hz sample rotation. A total of 512 transients were acquired per spectra using 4 dummy scans. This setup was chosen primarily for the high resolution needed for unsaturation quantification and stability of the unsaturated groups {re98, ka04, re00}. All chemical shifts were indirectly referenced to TMS at 0.00 ppm using the signal resulting from the residual protonated solvent at 5.95 ppm.

Characteristic signals corresponding to the presence of terminal vinylidene groups ($CH_2=C(CH_3)-R$) were observed and the amount quantified using the integral of one of the equivalent two terminal $CH_2$ protons ($H_{t1}$ and $H_{t2}$) $H_{t2}$ at 4.70 ppm accounting for the number of reporting sites per functional group:

$$Ntermv = IH_{t2}$$

When characteristic signals corresponding to the presence of internal vinylidene groups ($R-C(=CH_2)-R'$) were observed, then the amount quantified using the integral of the two equivalent internal $CH_2$ protons $H_i$ at 4.77 ppm and subtract the integral of $H_{t2}$ at 4.70 ppm (the second equivalent proton from terminal vinylidene $H_{t1}$ resonates as well at 4.77 ppm; compensation performed by subtracting $IH_{t2}$) accounting for the number of reporting sites per functional group:

$$Nintv = (IH_i - IH_{t2})/2$$

When characteristic signals corresponding to the presence of internal vinylidene groups ($R-C(=CH_2)-R'$), were not visually observed, then these groups were not counted and the parameter Nintv was not used.

The Hostanox 03 stabliser was quantified using the integral of multiplet from the aromatic protons (A) at 6.92, 6.91, 6.69 and at 6.89 ppm and accounting for the number of reporting sites per molecule:

$$H = IA/4$$

As is typical for unsaturation quantification in polyolefins the amount of unsaturation was determined with respect to total carbon atoms, even though quantified by $^1$H NMR spectroscopy. This allows direct comparison to other microstructure quantities derived directly from $^{13}$C NMR spectroscopy.

The total amount of carbon atoms was calculated from integral of the bulk aliphatic signal between 2.60 and 0.00 ppm with compensation for the methyl signals from the stabiliser and carbon atoms relating to unsaturated functionality not included by this region:

$$NCtotal = (Ibulk - 42*H)/2 + 2*Ntermv + 2*Nintv$$

The content of unsaturated groups (U) was calculated as the number of unsaturated groups in the polymer per hundred thousand total carbons (100 kCHn):

$$U = 100000*N/NCtotal$$

The total amount of unsaturated group was calculated as the sum of the individual observed unsaturated groups and thus also reported with respect per hundred thousand total carbons:

$$Utotal = Utermv + Uintv$$

The ratio of both $H_{t1}$ from terminal vinylidene and $H_i$ from internal vinylidene resonating at 4.77 ppm to $H_{t2}$ from terminal vinylidene at 4.70 ppm groups (Rv) is reported as the ratio of the given signals:

$$[Rv] = IH_{t1}H_i/IH_{t2}$$

REFERENCES re98
L. Resconi, F. Piemontesi, I. Camurati, O. Sudmeijer, J. Am. Chem. Soc. 1998, 120, 2308-2321
ka04
N. Kawahara, S. Kojoh, Y. Toda, A. Mizuno, N. Kashiwa, Polymer 45 (2004), 2883-2888
re00
L. Resconi, L. Cavallo, A. Fait, F. Piemontesi, Chem. Rev. 2000, 100, 1253-1345

$MFR_2$ (230° C.) is measured according to ISO 1133 (230° C., 2.16 kg load). The $MFR_2$ of the polypropylene composition is determined on the granules of the material, while the $MFR_2$ of the melt-blown web is determined on cut pieces of a compression-molded plaque prepared from the web in a heated press at a temperature of not more than 200° C., said pieces having a dimension which is comparable to the granule dimension.

The xylene soluble fraction at room temperature (xylene cold soluble XCS, wt %): The amount of the polymer soluble in xylene is determined at 25° C. according to ISO 16152; 5$^{th}$ edition; 2005-07-01.

DSC analysis, melting temperature ($T_m$), melting enthalpy ($H_m$), crystallization temperature (T) and crystallization enthalpy (H): measured with a TA Instrument Q200 differential scanning calorimetry (DSC) on 5 to 7 mg samples. DSC is run according to ISO 11357/part 3/method $C_2$ in a heat/cool/heat cycle with a scan rate of 10° C./min in the temperature range of −30 to +225° C. Crystallization temperature (Tc) and crystallization enthalpy ($H_c$) are determined from the cooling step, while melting temperature ($T_m$) and melting enthalpy ($H_m$) are determined from the second heating step respectively from the first heating step in case of the webs.

Number Average Molecular Weight ($M_n$), Weight Average Molecular Weight ($M_w$), ($M_w/M_n$=MWD) of Propylene Homopolymer Molecular weight averages Mw, Mn and MWD were determined by Gel Permeation Chromatography (GPC) according to ISO 16014-4:2003 and ASTM D 6474-99. A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min. 200 μL of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving the polymer sample to achieve concentration of ~1 mg/ml (at 160° C.) in stabilized TCB (same as mobile phase) for 2.5 hours for PP at max. 160° C. under continuous gently shaking in the autosampler of the GPC instrument. The MWD of the polypropylene composition is determined on the granules of the material, while the MWD of the melt-blown web is determined on a fiber sample from the web, both being dissolved in an analogous way.

Grammage of the Web

The unit weight (grammage) of the webs in g/m² was determined in accordance with ISO 536:1995.

Hydrohead

The hydrohead or water resistance as determined by a hydrostatic pressure test is determined according to the WSP (worldwide strategic partners) standard test WSP 80.6 (09) as published in December 2009. This industry standard is in turn based on ISO 811:1981 and uses specimens of 100 cm² at 23° C. with purified water as test liquid and a rate of increase of the water pressure of 10 cm/min. An $H_2O$ column height of X cm in this test corresponds to a pressure difference of X mbar.

Air Permeability

The air permeability was determined in accordance with DIN ISO 9237 at a pressure difference of 100 Pa. This air permeability is defined as the velocity of an air flow passing perpendicularly through the web specimen.

B. Examples

The catalyst used in the polymerization process for the propylene homopolymer of the inventive example (IE-1) and (IE-2) was the commercial Avant ZN180M of LyondellBasell.

The catalyst was used together with donor C.

The aluminium to donor ratio, the aluminium to titanium ratio and the polymerization conditions are indicated in tables 1 and 2.

Polymerization was performed in a polypropylene (PP) pilot plant.

TABLE 1

Preparation of the propylene homopolymer IE-1

|  |  | IE-1 |
|---|---|---|
| TEAL/Ti | [mol/mol] | 170 |
| TEAL/Donor | [mol/mol] | 10 |
| Catalyst feed | [g/h] | 1.4 |
| Loop (H-PP1) |  |  |
| Time | [h] | 0.7 |
| Temperature | [° C.] | 70 |
| Pressure | [kPa] | 5500 |
| MFR$_2$ | [g/10 min] | 86 |
| XCS | [wt %] | 2.5 |
| H$_2$/C3 ratio | [mol/kmol] | 3.8 |
| amount | [wt %] | 62 |
| GPR1 |  |  |
| Time | [h] | 2.4 |
| Temperature | [° C.] | 75 |
| Pressure | [kPa] | 2131 |
| MFR$_2$ | [g/10 min] | 90 |
| XCS | [wt.-%] | 2.4 |
| H$_2$/C3 ratio | [mol/kmol] | 58 |
| amount | [wt.-%] | 38 |

The propylene homopolymer was compounded by using a co-rotating twin-screw extruder at 200-230° C. with 1700 ppm of 2,3-Dimethyl-2,3-diphenylbutane (Pergasafe, sold by Pergan GmbH), 400 ppm calcium Stearate (CAS No. 1592-23-0) and 1000 ppm Irganox 1010 supplied by BASF AG, Germany (Pentaerythrityl-tetrakis(3-(3',5'-di-tert.butyl-4-hydroxyphenyl)-propionate, CAS No. 6683-19-8).

TABLE 2

Preparation of the propylene homopolymer IE2:

|  |  | IE-2 |
|---|---|---|
| TEAL/Ti | [mol/mol] | 170 |
| TEAL/Donor | [mol/mol] | 10 |
| Catalyst feed | [g/h] | 1.4 |
| Loop (H-PP1) |  |  |
| Time | [h] | 0.7 |
| Temperature | [° C.] | 70 |
| Pressure | [kPa] | 5500 |
| MFR$_2$ | [g/10 min] | 25 |
| XCS | [wt %] | 2.3 |
| H$_2$/C3 ratio | [mol/kmol] | 2.2 |
| amount | [wt %] | 60 |
| GPR1 |  |  |
| Time | [h] | 2.6 |
| Temperature | [° C.] | 75 |
| Pressure | [kPa] | 2131 |
| MFR$_2$ | [g/10 min] | 21 |
| XCS | [wt %] | 2.1 |
| H$_2$/C3 ratio | [mol/kmol] | 18.5 |
| amount | [wt %] | 40 |

The propylene homopolymer was compounded by using a co-rotating twin-screw extruder at 200-230° C. with 2200 ppm of 2,3-Dimethyl-2,3-diphenylbutane (Pergasafe, sold by Pergan GmbH), 400 ppm calcium Stearate (CAS No. 1592-23-0) and 1000 ppm Irganox 1010 supplied by BASF AG, Germany (Pentaerythrityl-tetrakis(3-(3',5'-di-tert.butyl-4-hydroxyphenyl)-propionate, CAS No. 6683-19-8).

For Comparative Example (CE-1) the commercial propylene homopolymer Borflow™ HL512FB (sold by Borealis) based on a Ziegler-Natta type catalyst having a MFR2 of 1200 g/10 min and being produced in a visbreaking process was used.

The polypropylene compositions of IE1, IE2 and CE1 have been converted into melt-blown webs on a Reicofil MB250 line using a spinneret having 470 holes of 0.4 mm exit diameter and 35 holes per inch. Webs were produced at different melt temperatures, throughputs, DCD (die to collector distance) and air volumes.

The processing conditions for and properties of the melt-blown webs are indicated in tables 3 and 4.

TABLE 3

Processing conditions for the production of the melt-blown webs

| Example | Melt Temperature ° C. | DCD mm | Air volume m³/h | Throughput kg/h · m | Web weight g/m² |
|---|---|---|---|---|---|
| IE1-1 | 290 | 200 | 250 | 10 | 10.1 |
| IE1-2 | 300 | 200 | 200 | 10 | 9.7 |
| IE1-3 | 300 | 500 | 230 | 10 | 10.0 |
| IE1-4 | 310 | 200 | 120 | 10 | 8.4 |
| IE1-5 | 310 | 200 | 220 | 30 | 10.6 |
| IE2-1 | 290 | 200 | 320 | 10 | 9.7 |
| IE2-2 | 300 | 200 | 230 | 10 | 10.4 |
| IE2-3 | 320 | 200 | 160 | 10 | 8.2 |
| CE1-1 | 250 | 200 | 360 | 10 | 9.5 |
| CE1-2 | 260 | 200 | 320 | 10 | 9.5 |
| CE1-3 | 260 | 200 | 400 | 30 | 9.8 |

TABLE 4

Properties of the melt-blown webs

| Example | Air permeability mm/s | Hydrohead (3rd drop) cm H₂O* | Shift 1 4.77 ppm | Shift 2 4.70 ppm | Ratio Rv | Utotal /100000 C. |
|---|---|---|---|---|---|---|
| IE1-1 | 785 | 92 | 100 | 99.0 | 1.01 | 31 |
| IE1-2 | 680 | 102 | 100 | 103.7 | 0.96 | 38 |
| IE1-3 | 805 | 79 | 100 | 103.1 | 0.97 | 40 |
| IE1-4 | 370 | 131 | 100 | 103.3 | 0.97 | 46 |
| IE1-5 | 1050 | 58 | 100 | 104.2 | 0.96 | 37 |
| IE2-1 | 810 | 72 | 100 | 97.3 | 1.03 | 38 |
| IE2-2 | 740 | 89 | 100 | 101.3 | 0.99 | 51 |
| IE2-3 | 490 | 130 | 100 | 99.1 | 1.01 | 64 |
| CE1-2 | 1060 | 71 | 100 | 70.5 | 1.42 | 25 |
| CE1-1 | 905 | 21 | 100 | 56.1 | 1.78 | 26 |
| CE1-3 | 1045 | 65 | 100 | 55.3 | 1.81 | 28 |

Figure 2:
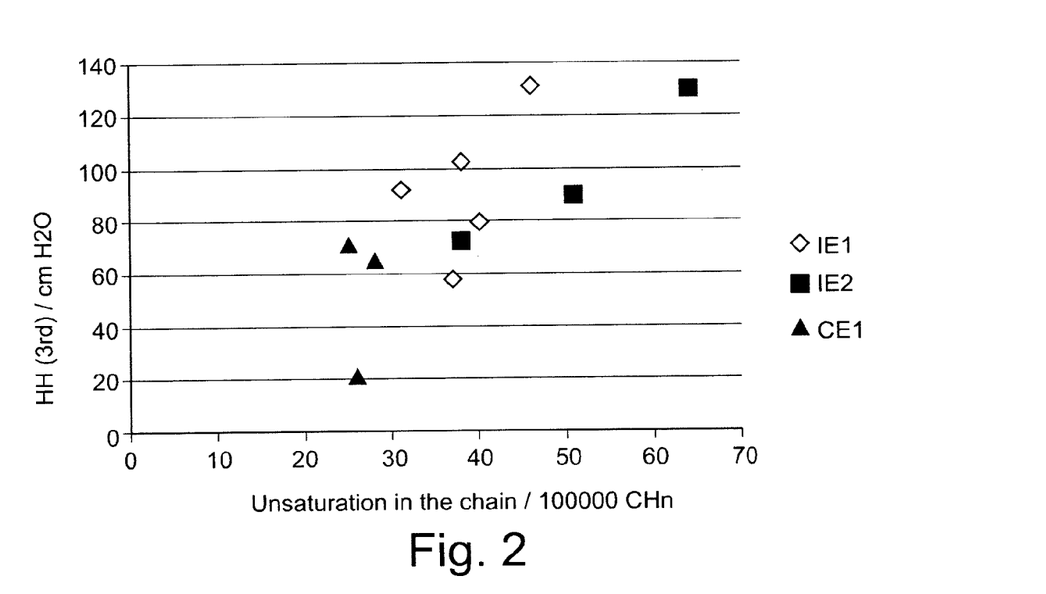
FIG. 2 illustrates hydrohead ($3^{rd}$ drop) (cm $H_2O$) versus unsaturation level (Unsaturation/100000 CHn) for IE1, 1E2, and CE1.

It can be seen from above that the higher the unsaturation level is, the better the barrier properties are. (see also FIG. 2)

It can be further seen that the higher the unsaturation level is, the higher melt temperature can be used for preparing the webs. (see FIG. 1)

Figure 3:
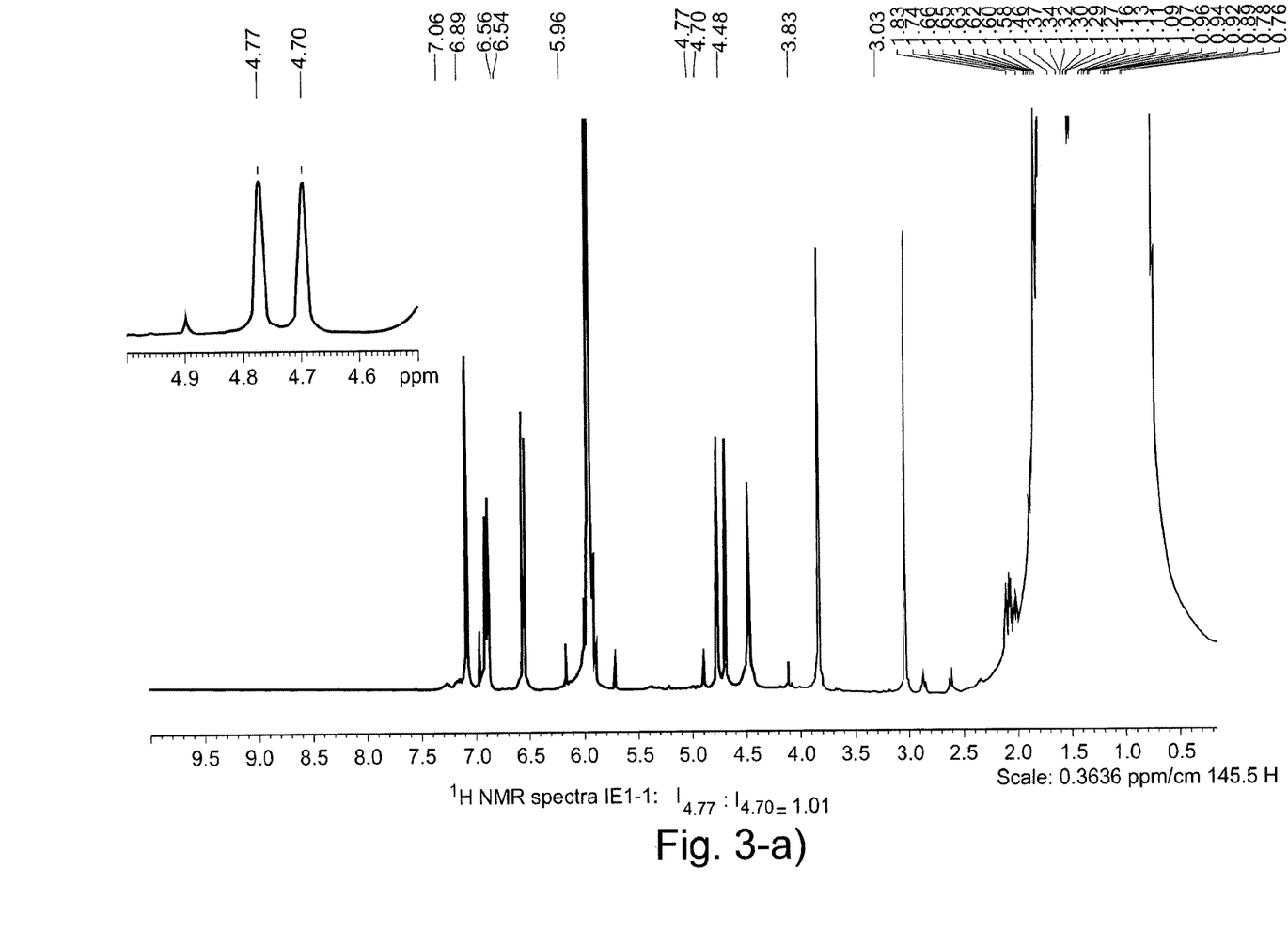

FIG. 3 shows the NMR spectra of IE1-1 and CE1-1.

The invention claimed is:

1. Melt-blown web comprising melt-blown fibers made of at least 95 wt % of a polypropylene composition comprising:
   (A) a polypropylene homopolymer, wherein the polypropylene homopolymer comprises at least 95 wt % of the polypropylene composition, and
   (B) optionally a polymeric nucleating agent,
   wherein the melt-blown web shows an integral ratio [Rv], being defined as ratio of the integral value specifying the area under the peak with the chemical shift at 4.77 ppm of a ¹H NMR spectrum to the integral value specifying the area under the peak with the chemical shift at 4.70 ppm ¹H NMR spectrum, of 0.95 to 1.03, whereby the ¹H NMR spectrum was determined by solution-state ¹H-NMR spectroscopy,
   wherein the polypropylene composition has been prepared by visbreaking with at least one compound (C) being capable of thermally decomposing into carbon-based free radicals of formula (I) or (II) by breaking at least one single bond:

wherein in these formulas each of
   $R_1$, $R_2$, $R_3$, $R_4$, $R_5$ and $R_6$ can be independently selected from hydrogen, substituted or unsubstituted straight chain, branched or cyclic saturated or mono-unsaturated hydrocarbons with 1 to 12 C-atoms, substituted or unsubstituted aromatic hydrocarbons with 5 to 12 C-atoms or carboxylate groups COOX, with X being a $C_1$-$C_6$-alkyl group,
   whereby at least one of $R_1$, $R_2$, $R_3$, $R_4$, $R_5$ or $R_6$ is a substituted or unsubstituted aromatic hydrocarbon with 5 to 12 C-atoms.

2. Melt-blown web according to claim 1, having a total unsaturation, being defined as sum of terminal vinylidene and internal vinylidene, of more than 28/100000 C atoms determined by liquid-state proton-NMR spectroscopy.

3. Melt-blown web according to claim 1,
   wherein the amount of compound(s) (C) being added to the polypropylene composition for visbreaking is in the range of 0.01 to 10 wt % based on the polypropylene composition.

4. Melt-blown web according to claim 1, wherein the carbon-based free radicals of formula (I) or (II) being generated from one or more compounds (C) of the formula (III):

wherein each of $R_1$, $R_3$, $R_4$ and $R_6$ independently is selected from the group consisting of hydrogen, substituted and unsubstituted straight, branched, and cyclic, hydrocarbons with 1 to 12 C-atoms and substituted and unsubstituted aromatic hydrocarbons with 5 to 12 C-atoms, and
each of $R_2$ and $R_5$ independently is selected from the group consisting of substituted and unsubstituted straight, branched, and cyclic hydrocarbons with 1 to 12 C-atoms and substituted and unsubstituted aromatic hydrocarbons with 5 to 12 C-atoms and wherein at least one of $R_1$, $R_2$, $R_3$, $R_4$, $R_5$ and $R_6$ is a substituted or unsubstituted aromatic hydrocarbon with 5 to 12 C-atoms.

5. Article comprising the melt-blown web according to claim 1, wherein said article is selected from the group consisting of filtration media, diapers, sanitary napkins, panty liners, incontinence products for adults, protective clothing, breathing protection masks, surgical drapes, surgical gowns, and surgical wear.

\* \* \* \* \*